(12) United States Patent
Johnston et al.

(10) Patent No.: US 6,827,459 B2
(45) Date of Patent: Dec. 7, 2004

(54) LIGHTED FASTENING STRUCTURE

(75) Inventors: Raymond P. Johnston, Lake Elmo, MN (US); Brian E. Spiewak, Inver Grove Heights, MN (US); Jennifer R. Yi, Roseville, MN (US); Robert L. Brott, Woodbury, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 75 days.

(21) Appl. No.: 10/107,655

(22) Filed: Mar. 27, 2002

(65) Prior Publication Data

US 2003/0184991 A1 Oct. 2, 2003

(51) Int. Cl.[7] ................................................. F21V 7/04
(52) U.S. Cl. ............................ 362/31; 30/26; 30/800; 200/313
(58) Field of Search ............................ 362/22, 23, 26, 362/27, 31, 330, 319, 85; 24/584.1, 586.1; 200/313, 314, 317

(56) References Cited

U.S. PATENT DOCUMENTS

| | | |
|---|---|---|
| 3,266,113 A | 8/1966 | Flanagan, Jr. |
| 3,879,835 A | 4/1975 | Brumlik |
| 4,109,118 A | 8/1978 | Kley |
| 4,249,044 A | 2/1981 | Larson |
| 4,290,832 A | 9/1981 | Kalleberg |
| 4,421,958 A | 12/1983 | Kameda |
| 4,500,758 A | 2/1985 | Guckenheimer |
| 4,508,942 A | 4/1985 | Inaba |
| 4,862,499 A | 8/1989 | Jekot et al. |
| 4,894,060 A | 1/1990 | Nestegard |
| 5,083,240 A * | 1/1992 | Pasco .......................... 362/26 |
| 5,119,531 A | 6/1992 | Berger et al. |
| 5,130,897 A * | 7/1992 | Kuzma ........................ 362/24 |
| 5,235,731 A | 8/1993 | Anzai |
| 5,398,387 A | 3/1995 | Torigoe et al. |
| 5,457,297 A | 10/1995 | Chen |
| 5,505,747 A | 4/1996 | Chesley et al. |
| 5,514,843 A | 5/1996 | Wilfong et al. |
| 5,630,501 A | 5/1997 | Tsay |
| 5,666,112 A | 9/1997 | Crowley et al. |

(List continued on next page.)

FOREIGN PATENT DOCUMENTS

| | | |
|---|---|---|
| DE | 32 18 404 A1 | 11/1983 |
| DE | 198 19 693 A1 | 11/1999 |
| DE | 200 02 680 U1 | 6/2000 |
| DE | 200 09 377 U1 | 9/2000 |
| DE | 200 09 919 U1 | 9/2000 |
| DE | 200 16 887 U1 | 2/2001 |

(List continued on next page.)

OTHER PUBLICATIONS

IBM Technical Disclosure Bulletin, "Key Matrix Using a Fluid Medium," p. 744, Aug. 1970.

*Primary Examiner*—Sandra O'Shea
*Assistant Examiner*—Ali Alavi
(74) *Attorney, Agent, or Firm*—Stephen W. Buckingham

(57) ABSTRACT

In one embodiment, the invention is directed toward an apparatus that includes a first layer and a second layer attached with one another via sets of fastening elements formed on the layers. The fastening elements may comprise hook-like elements that engage one another in an interlocking arrangement to attach the layers, or alternatively, the fastening elements may take any form envisioned by a designer. In any case, the apparatus may also form a light guide that can be illuminated with a light source to transmit light by total internal reflection (TIR).

47 Claims, 10 Drawing Sheets

U.S. PATENT DOCUMENTS

| | | | |
|---|---|---|---|
| 5,742,242 A | 4/1998 | Sellers | |
| 5,760,351 A | 6/1998 | Tsai | |
| 5,812,116 A | 9/1998 | Malhi | |
| 5,874,700 A | 2/1999 | Hochgesang | |
| 5,879,088 A | 3/1999 | English | |
| 5,967,298 A | 10/1999 | Watanabe et al. | |
| 5,975,711 A * | 11/1999 | Parker et al. | 362/24 |
| 6,064,019 A | 5/2000 | Buchan et al. | |
| 6,100,478 A | 8/2000 | LaPointe et al. | |
| 6,130,593 A | 10/2000 | Van Zeeland | |
| 6,137,072 A | 10/2000 | Martter et al. | |
| 6,144,003 A | 11/2000 | Kamishima | |
| 6,178,619 B1 | 1/2001 | Tai | |
| 6,575,586 B1 * | 6/2003 | Tsau | 362/85 |

FOREIGN PATENT DOCUMENTS

| | | |
|---|---|---|
| EP | 0 763 838 | 3/1997 |
| EP | 0 942 444 A2 | 9/1999 |
| EP | 1 001 443 A1 | 5/2000 |
| EP | 1 024 510 A2 | 8/2000 |
| EP | 1 056 107 A2 | 11/2000 |
| EP | 1065687 | 1/2001 |
| GB | 2285518 | 7/1995 |
| WO | WO 98/39785 | 9/1998 |
| WO | WO 01/58302 | 8/2001 |
| WO | WO 01/58780 | 8/2001 |
| WO | WO 02/091415 | 11/2002 |
| WO | WO 02/091416 | 11/2002 |

* cited by examiner

LIGHTED FASTENING STRUCTURE

FIELD

The invention relates generally to fastening structures, and more particularly to fastening structures for use in various devices and apparatuses including electronic switch arrays.

BACKGROUND

Electronic switches are used to provide input to computer devices. Electronic switches generate signals in response to physical force. For example, a user may actuate an electronic switch by pressing a key. Pressing the key causes a force to be applied on an electronic membrane, which in turn causes the electronic membrane to generate an electronic signal. Computer keyboards, keypads, and membrane switches are common examples of switch arrays.

SUMMARY

In general, the invention provides a fastening structure that also functions as a light guide. The light guide fastening structure may be used in a wide variety of applications including applications in switch arrays as outlined in greater detail below. For example, in accordance with the invention, an apparatus may comprise a first layer including a first set of fastening elements, and a second layer including a second set of fastening elements. The first and second sets of fastening elements may be engaged, thereby attaching the first layer to the second layer, and one of the first or second layers may comprise a light guide.

In one exemplary embodiment, the light guide fastening structure may include light guide films that include fastening elements having hook-like shapes. The hook-shaped fastening elements may engage one another to attach the light guide films to one another. In this manner, the light guide fastening structure can define a predetermined amount of travel, such as an amount of key travel in a switch array embodiment. In addition, the fastening structure can also function as an alignment structure that provides resistance to key rocking and provides a larger useful contact area for the key, e.g., a larger "sweet spot."

One or more light sources, such as light emitting diodes (LEDs), can be implemented to illuminate the light guide fastening structure. For example, in the switch array embodiment, LEDs can be implemented with the light guide fastening structure to illuminate the areas between keys, or even the keys themselves. For example, in one embodiment, a number of top layer sections form keys without the use of additional keycaps, and in another embodiment, a transparent or partially transparent membrane covers the top layer sections. In those cases, by illuminating the top layer sections, the keys themselves can be illuminated.

Additional details of these and other embodiments are set forth in the accompanying drawings and the description below. Other features, objects and advantages will become apparent from the description and drawings, and from the claims.

DETAILED DESCRIPTION

In general, the invention is directed toward an apparatus that includes a first layer and a second layer attached with one another via sets of fastening elements formed on the layers. For example, the fastening elements may comprise hook-like elements that engage one another in an interlocking arrangement to attach the layers. Alternatively, the fastening elements may take any form envisioned by a designer. In any case, the apparatus may also form a light guide that can be illuminated with a light source to transmit light by total internal reflection (TIR). In this manner, functional or decorative lighting can be provided to the fastening structure.

The light guide fastening structure may be used in a variety of applications. For example, some of the details below are provided in the context of one specific implementation within switch arrays. In that case, a number of top layers can be attached to a bottom layer to define keys of the switch array. Moreover, by forming the layers to transmit light via total internal reflection (TIR), aesthetic or functional lighting can be provided to the switch array. For example, a layer may be configured to emit light at selected areas such as areas coinciding with keys on a keypad to thereby illuminate the keys. Nevertheless, it is understood that the switch array embodiments are simply an exemplary context for describing a much broader concept of integrating light guide functionality into fastening structures.

Figure 1A:
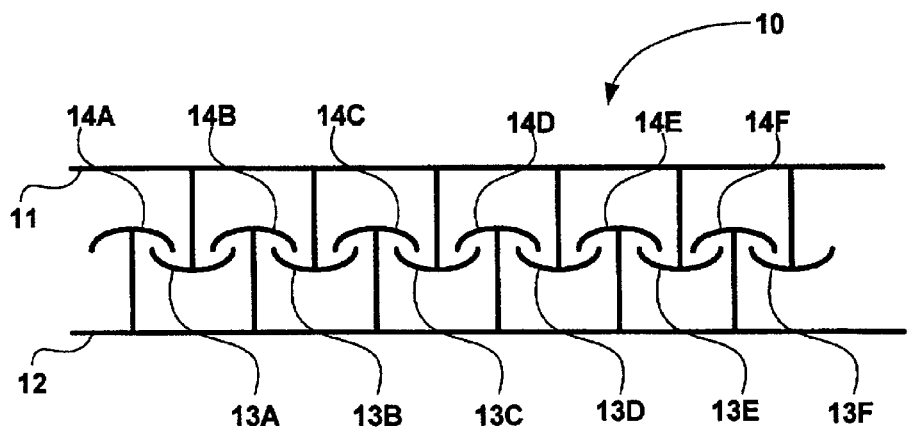
FIGS. 1A and 1B are a cross-sectional side views of a fastening structure according to an embodiment of the invention.
Figure 1B:
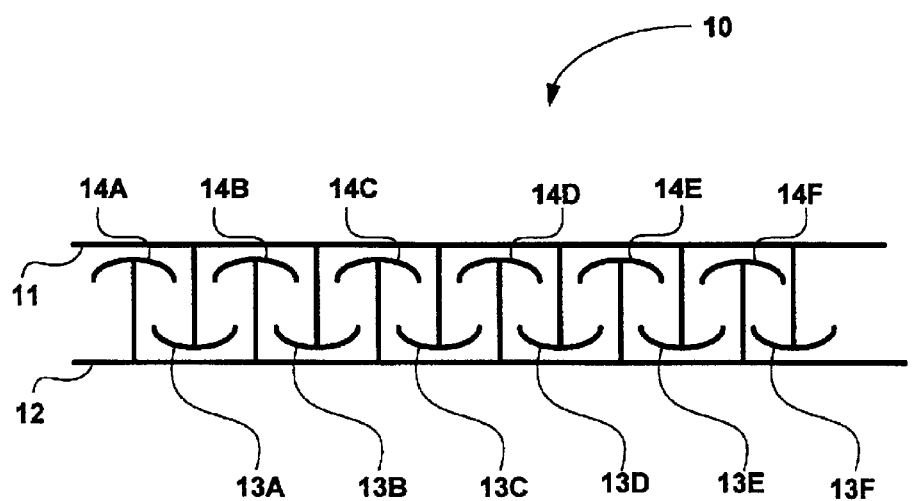

FIGS. 1A and 1B are cross-sectional side views of a fastening structure 10 according to an embodiment of the invention. As shown, a top layer 11 includes a set of fastening elements 13A–13F (hereafter fastening elements 13), and a bottom layer 12 includes another set of fastening elements 14A–14F (hereafter fastening elements 14). A portion of one of the layers 11, 12 functions as a light guide. For example, the portion that functions as a light guide may comprise one of the layers 11, 12 in its entirety, both layers in their entireties, or part of one or both layers. In any case, decorative or functional lighting can be provided to the fastening structure 10 without adding additional light guiding components.

The fastening elements 13, 14 have sufficient rigidity to allow top layer 11 and bottom layer 12 to be securely fastened to one another. Generally, the fastening elements 13, 14 are subject to a wide variety of shapes and sizes. However, in one specific example as illustrated, fastening elements 13, 14 comprise hook-like elements that engage one another in an interlocking arrangement. By way of example, the distance between respective hook-like elements, e.g., the distance between fastening element 13A and 13B at the point of attachment to the base may be on the order of 0.25 centimeters, although the invention is not limited in that respect. The number of fastening elements 13, 14 that reside on each respective layer 10, 11 may depend on the width of the given layer. The lengths of the fastening elements may be the same as the length of the base of a given layer, or may have a length different than the base of the layer, if desired. For example, in the embodiment illustrated in FIG. 2, the length of the fastening elements is less than that of the base.

The fastening structure 10, illustrated in FIGS. 1A and 1B may further include spring-like elements (not shown) such as elastic balls or posts to provide a biasing force that tends to bias the top layer 11 and bottom layer 12 in an open position (as illustrated in FIG. 1A). The layers 11, 12 may be engaged by snapping or sliding them together. Various engaged configurations may allow transmission of light between the layers as described in greater detail below. In this manner, a number of lighting effects may be achieved.

The predetermined distance of travel allowed between the top and bottom layers 11, 12 may be proportional to the size of one or more of the fastening elements 13, 14. For example, the height at which the fastening elements 13, 14 protrude from the respective top and bottom layers 11, 12 may be slightly larger than the amount of travel allowed between the top and bottom layers 11, 12.

The fastening elements 13, 14 may have an element width (the distance between the outermost ends of each fastening elements 13, 14, measured in a plane parallel to the base of the layer 11, 12 associated with the given element) in the range of 0.01 centimeters to 1 centimeter. The distance of travel may be in the range of 0.01 centimeters to 1 centimeter. For example, a distance of travel of less than 3 millimeters, less than 2 millimeters, or even less than 1 millimeter may be desirable for various applications, including applications in switch arrays such as keyboards, keypads or membrane switches. In any case, the amount of travel can be designed according to particular design specifications.

Figure 2:
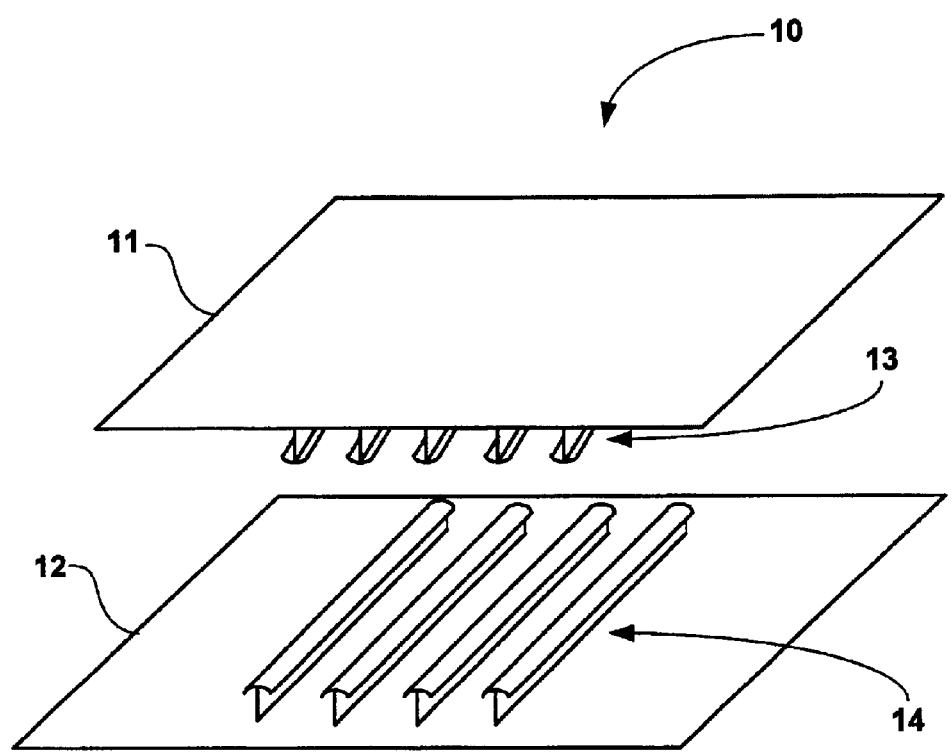
FIG. 2 is a perspective view of a fastening structure in an unengaged state.

FIG. 2 is a perspective view of fastening structure 10 in an unengaged state. For example, each of the top and bottom layers 11, 12 may comprise films of material extruded according to the desired shape of fastening elements 13, 14. In some cases, one of the layers 11, 12 may comprise more than one type of material, in which case, co-extrusion can be used to form the layer. For example, in some cases, it may be desirable to form portions of fastening elements 13, 14 out of material different than the base of one of layers 11, 12.

Additionally, in some cases, the size of fastening elements 13, 14 may be different for different layers 11, 12, or may even have different sizes on a given layer 11, 12. For example, in some cases, fastening structure 10 can be designed to have a contoured shape. In that case, the different fastening elements 13, 14 of the different layers 11, 12 may have different sizes to accommodate a contour shape of structure 10 when the top and bottom layers 11, 12 are engaged.

Part of fastening structure 10 forms a light guide. Either top layer 11, bottom layer 12, or both can be extruded using a material that can transmit light via total internal reflection (TIR). Alternatively, only a portion of top layer 11, bottom layer 12, or both may form a light guide, in which case, a co-extrusion process may be used to form the layer that is only partially a light guide. In either case, fastening structure 10 can integrate the advantages of a fastener structure, including adhesion capabilities, alignment capabilities and other advantages, with light guide functionality to provide aesthetic, decorative, or functional lighting in any of a number of end applications. Coatings may be applied to fastening structure 10 to improve the TIR through fastening structure 10. In addition, notching or coating techniques may be applied to extract light according to a desired lighting effect.

Figure 3:
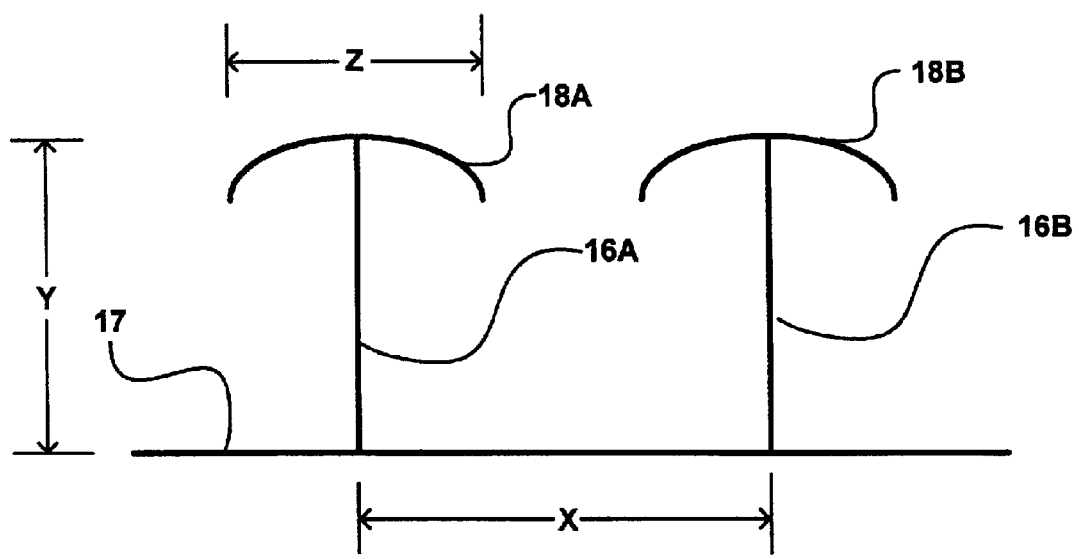
FIG. 3 is a cross-sectional side view of two exemplary fastening elements.

FIG. 3 is a cross-sectional side view of two fastening elements. Again, although illustrated as having a hook-like shape, the fastening elements may take other forms. If the fastening elements have a hook-like shape, they may include a stem 16A, 16B that attaches hook 18A, 18B to base 17. Distance (X) between stems 18A and 18B may be on the order of 0.25 centimeters although the invention is not necessarily limited in that respect. The height (Y) of fastening elements may be in the range of 0.01 centimeters to 1 centimeter although the invention is not necessarily limited in that respect. The fastening element width (Z) may be in the range of 0.01 centimeters to 1 centimeter although the invention is not necessarily limited in that respect. These shapes and sizes are exemplary for applications in switch arrays. For other applications, the shapes and sizes may be different. For example, sizes larger than those outlined above, by a factor of 10 may be useful for various other applications. Smaller sizes may also be implemented.

Figure 4:
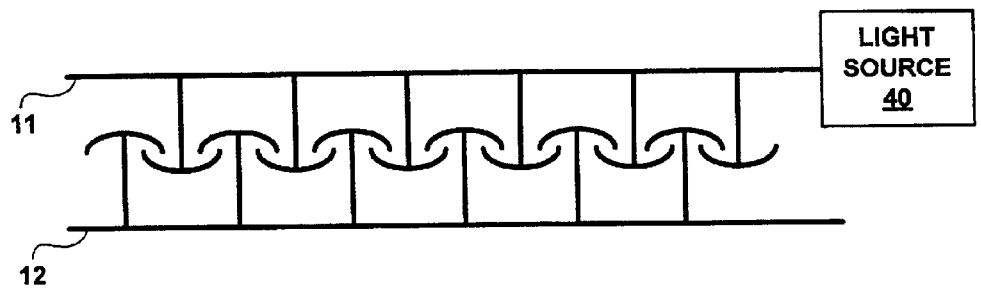
FIGS. 4–6 are cross-sectional side views of a light guide fastening structure and a light source positioned to illuminate the light guide fastening structure.
Figure 5:
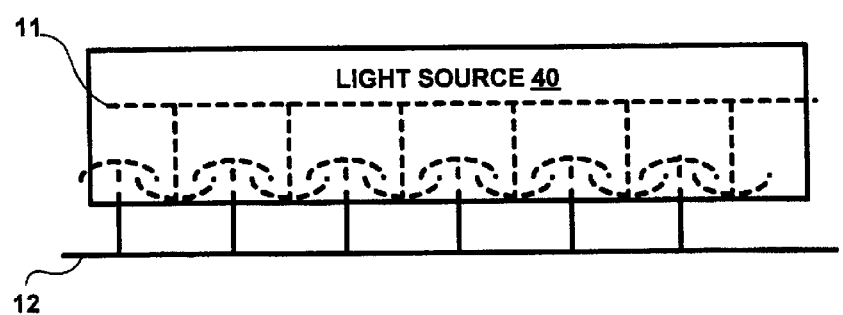
Figure 6:
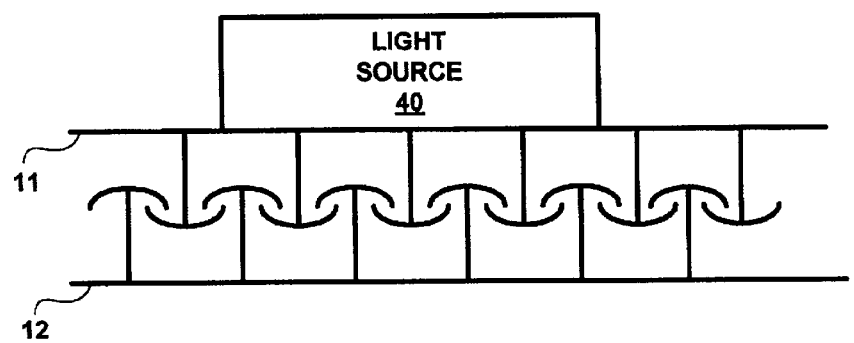

FIGS. 4–6 are cross-sectional side views of a light guide fastening structure and light source positioned to illuminate the light guide fastening structure. Light source 40 may comprise any type of light source including an incandescent light source or a fluorescent light source. In many cases, light source 40 may comprise a semiconductor light source such as a light emitting diode (LED). Light source 40 may be positioned adjacent light guide fastening structure 10 so that light guides that form structure 10 can be illuminated to provide the desired lighting effect. Although FIGS. 4–6 illustrate three example configurations for positioning a light source 40 to illuminate light guide fastening structure 10, the configurations of FIGS. 4–6 are exemplary. Other configurations may also exist. In any case, a variety of different emission techniques using notches or coating, for example, can be applied to the top or bottom layers 11, 12 to cause light to be emitted from the layers in a controlled or random manner, e.g., at selected positions on the fastening structure. More generally, emission features may comprise surface topography features such as notches, depressions or protrusions, or may comprise material property features such as coatings or other material properties.

Figure 7:
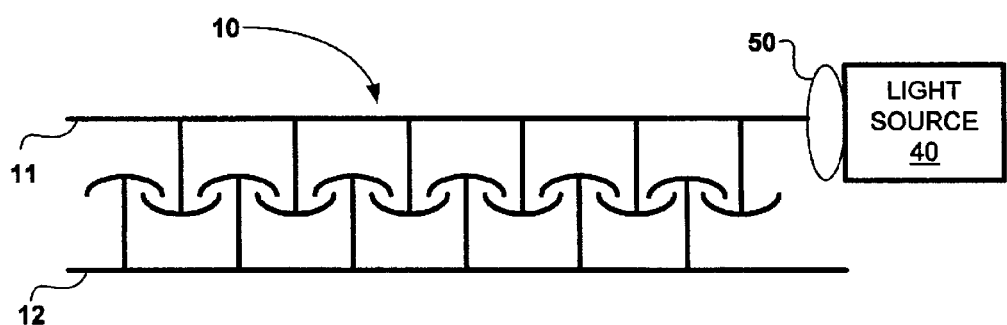
FIGS. 7 and 8 are cross-sectional side views of a light guide fastening structure, one or more light sources positioned to illuminate the light guide fastening structure, and one or more optical elements positioned to improve illumination of the light guide fastening structure.

As illustrated in FIG. 7, one or more optical elements may be used to improve the transfer of light from light source 40 to light guide fastening structure 10. For example, lens 50 may be positioned between light source 40 and light guide fastening structure 10 to adequately condition the light prior to being transmitted through light guide fastening structure 10 via total internal reflection (TIR). Lens 50 may represent one or more optical elements, or possibly a more complex optical system for improving illumination of light guide fastening structure 10.

Figure 8:
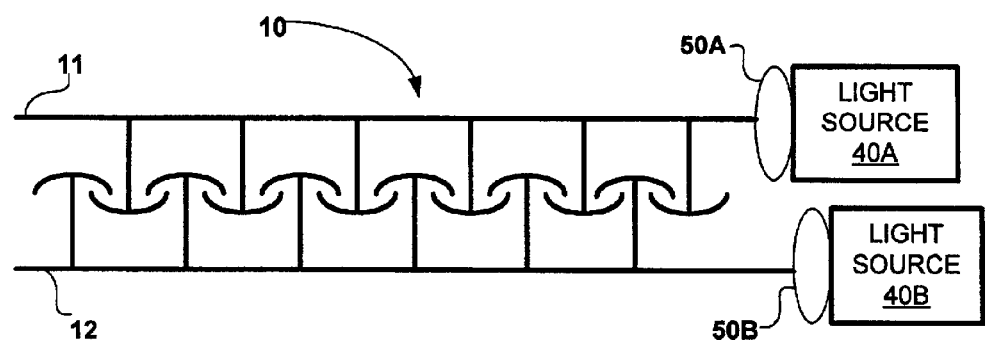

As illustrated in FIG. 8, more than one light source 40A and 40B may be used to illuminate light guide fastening structure 10. In that case, each light source 40A, 40B may have a lens 50A, 50B or a more complex optical system for improving illumination of light guide fastening structure 10. Indeed, any number of light sources may be used. In some cases, the light sources may be chosen so that top and bottom layers are illuminated differently, e.g., with different colors, different intensities, or different temporal on/off (flashing) patterns. Also, different light sources may also be used to achieve various lighting effects such as additive color effects and on-off light switching as described in greater detail below.

Figure 9A:
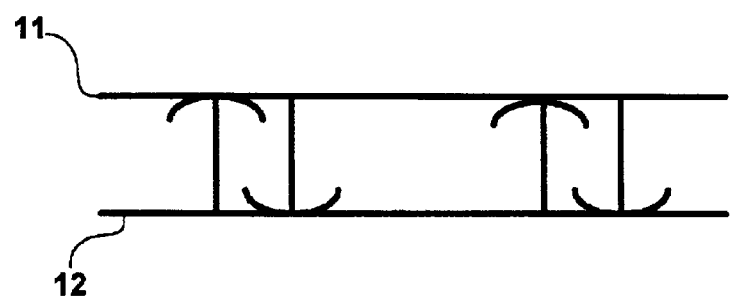
FIGS. 9A–9C are cross-sectional side views illustrating a light guide fastening structure with a top layer and a bottom layer respectively positioned relative to one another in three possible configurations.
Figure 9B:
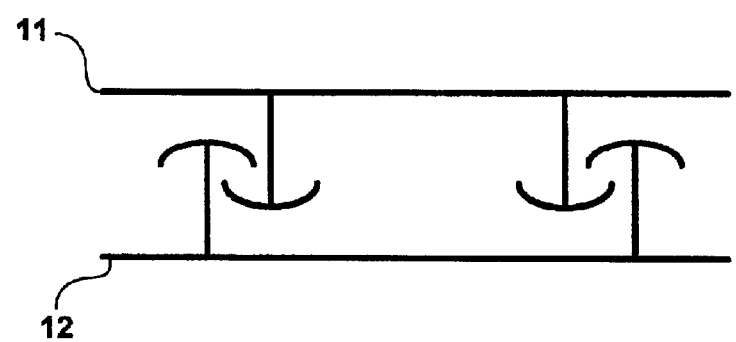
Figure 9C:
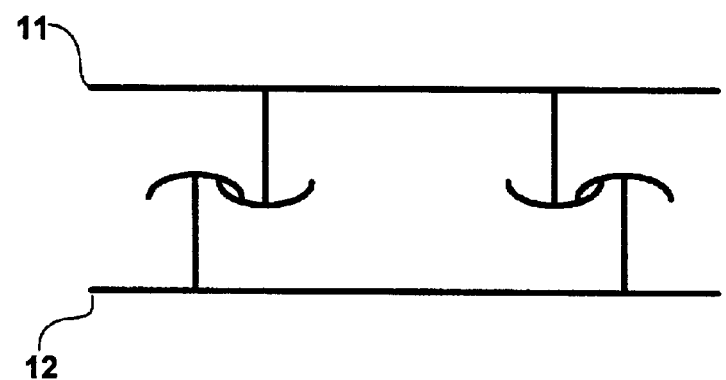

FIGS. 9A–9C illustrate light guide fastening structure 10 with top layer 11 and bottom layer 12 respectively positioned relative to one another in three possible configurations. FIG. 9A illustrates a depressed configuration in which the fastening elements of each layer 11, 12 are in intimate contact with the base of the other layer. FIG. 9B illustrates a partially depressed configuration in which the fastening elements of layers 11, 12 are not in intimate contact with the other layer. FIG. 9C illustrates a non-depressed configuration in which fastening elements of layers 11, 12 are in intimate contact with one another.

In accordance with the invention, different lighting effects can be presented depending upon the current configuration of layers 11, 12 relative to one another. For example, if only one of the layers is illuminated by a light source, light may be transferred to the other layer when the layers are in intimate contact (FIGS. 9A and 9C). The amount of light transfer between the layers may also be different for the different intimate contact configurations of FIGS. 9A and 9C. The shapes of the fastening elements may be designed to improve or enhance light transfer between the layers 11, 12 for one or more of the intimate contact configurations.

Additionally, if both layers 11, 12 are illuminated by a light source, additive color effects may be achieved. For example, if both layers are illuminated by a light source, the lighting effect may become more intense in certain locations when the layers 11, 12 are in intimate contact. Furthermore, the different layers may be illuminated by different colored light sources. In that case, intimate contact between layers 11 and 12 may cause the light being transmitted in the different layers to combine in an additive manner. For example, if layer 11 is illuminated with red light and layer 12 is illuminated with green light, the layers may appear yellow when they come in intimate contact. In that case, the red and green light combine in an additive manner to yield yellow light. The invention can exploit any of a wide variety of additive color phenomenon to achieve the desired illumination effect in light guide fastening structure 10. Again, the shapes of the fastening elements may be designed to improve or enhance light transfer between the layers 11, 12 for one or more of the intimate contact configurations. Also, various emission techniques using notches or coating, for example, can be applied to the top or bottom layers 11, 12 to cause light to be emitted from the layers in a controlled or random manner.

Figure 10:
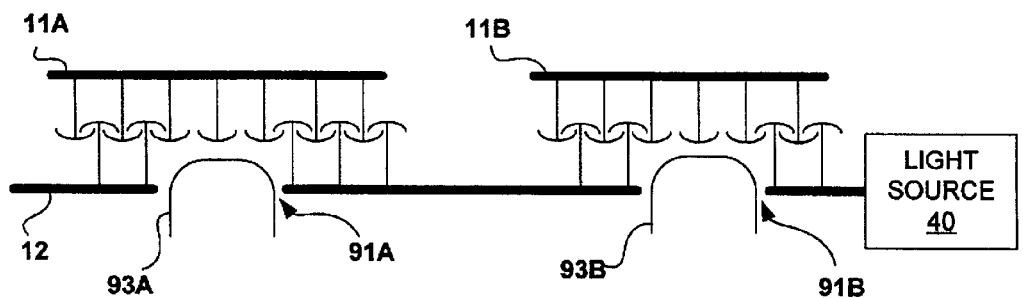
FIG. 10 is a cross-sectional side view of a light guide fastening structure used as part of a switch array.

FIG. 10 is a cross-sectional side view of a light guide fastening structure being used as part of a switch array. As mentioned, switch arrays are one exemplary application that can benefit from aspects of the invention. In this case, top layer 11 of light guide fastening structure includes a number of distinct top layer sections 11A and 11B. Each top layer section 11A, 11B is mechanically engaged with bottom layer 12 via sets of fastening elements. Bottom layer 12 may be formed with holes 91A, 91B and springs such as dome springs 93A and 93B may protrude through holes 91A, 91B to bias the top layer sections 11A, 11B away from bottom layer 12. In some cases, dome springs 93A and 93B may bias the top layer sections 11A and 11B by an amount sufficient to place the fastening elements of top layer sections into intimate contact with the fastening elements of bottom layer 12 (as illustrated in FIG. 9C). As illustrated, the dome springs 93A and 93B may abut the fastening elements of the top layer sections 11A and 11B. Alternatively the fastening elements of top layer sections 11A and 11B may be removed in the area corresponding to dome springs 93A and 93B, in which case the dome springs 93A and 93B may abut the base of top layer sections 11A and 11B.

A light source 40 may be positioned to illuminate bottom layer 12, or possibly to illuminate one or more of the top layer sections 11A or 11B. If bottom layer 12 is illuminated, the top layer sections 11A, 11B may also be illuminated via light transmission between the bottom layer 12 and each top layer section 11A, 11B. A user may actuate a key of the switch array, for example, causing top layer section 11A to press dome spring 93A. Upon pressing the key, the intimate contact between top layer section 11A and bottom layer 12 is discontinued (as illustrated in FIG. 9B). In that case, the key may change from an illuminated state to a non-illuminated state.

Also, in some cases, full depression of the key by a user may cause top layer section 11A and bottom layer to come back into intimate contact (as illustrated in FIG. 9A). In that case, the key may be re-illuminated. In this manner, a visual indication of key actuation may be presented to a user upon depressing a key. In other words, the key may blink-off momentarily when the user presses the key causing intimate contact between top layer section 11A and bottom layer 12 to be discontinued and then reestablished. The same effect may occur when the user releases the key. Alternatively, light guide fastening structure 10 may be designed to turn either off or on, and remain in the off or on state when a key is depressed. Furthermore, additive color affects may be achieved as described above.

If used in a switch array, top and bottom layers 11, 12 may provide a number of advantages in addition to the lighting effect. For example, engaged top and bottom layers 11, 12 can provide resistance to rocking of individual keys, and may ensure that individual keys are held in place and properly aligned with individual dome spring elements. In this manner, top and bottom layers 11, 12 can function as alignment structures for individual keys of a switch array.

Additionally, the layers 11, 12 can be fabricated at relatively low cost by extrusion or injection molding. Moreover, assembly of switch arrays can be simplified significantly by replacing discrete alignment structures with top and bottom layers 11, 12. The top and bottom layers 11, 12 can be engaged simply by sliding or snapping then together such that fastening elements (for example having hook-like configurations) overlap one another to provide an interlocking arrangement. Machining of mounting brackets for alignment structures can be avoided. Also, the use of fastening structure 10 may enable the realization of thinner switch arrays by reducing the amount of key travel and reducing the number of layers in the switch array. Moreover, the fastening structure 10 as described herein may provide a hermetic barrier or a partial hermetic barrier between the environment and sensors of a switch array.

In addition, layers 11, 12 may provide additional design freedoms to the design of switch arrays. By implementing the fastening structure according to the invention, a switch array may not need molding to hold the keys in place. Moreover, the shape and layout of the keys can be improved both functionally and/or aesthetically. For example, adjacent keys may not need to be separated by molding which can be particularly useful in switch arrays that form part of handheld devices such as cellular radio telephones and handheld computers. Also, because molding can be eliminated, more space may be dedicated to the keys themselves. At the same time, decorative or functional lighting effects can be implemented as outlined above.

Figure 11:
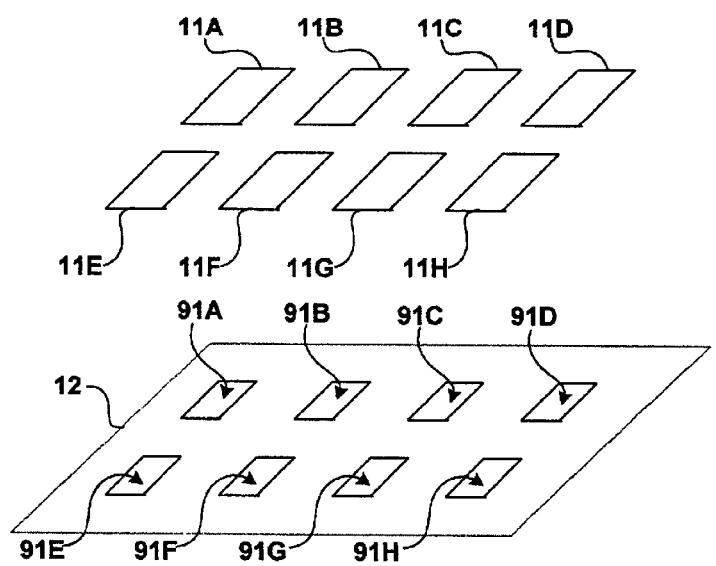
FIG. 11 is a perspective view of an unengaged light guide fastening structure configured for use in a switch array.

FIG. 11 is a perspective view of a light guide fastening structure 10 including a bottom layer 12 and a top layer including a plurality of top layer sections 11A–11H. Bottom layer 12 can be engaged with each top layer section 11A–11H as described above. Bottom layer 12 is formed with holes 91A–91H for aligning with spring elements (not shown) of a switch array. For example, holes 91 may be sized in the range of 0.1 to 2.0 square centimeters although the invention is not necessarily limited in that respect. In one particular implementation, holes 91 are square shaped with a surface area of approximately 0.635 square centimeters. Each top layer section 11A–11H may cover one of the holes 91A–91H when the layers are engaged. For example, the top and bottom layers 11, 12 can be engaged simply by sliding or snapping the top layer sections 11A–11H onto the bottom layer 12.

In a switch array, top layer sections 11A–11H may function as the keys that are depressed by a user. In this manner, thinner switch arrays, and/or switch arrays having fewer elements can be realized. Alternatively, additional keycaps (not shown) may be attached to the respective top layer sections to be depressed by a user. Furthermore, for membrane switches, a membrane cover may cover the light guide fastening structure. The membrane cover may be transparent or partially transparent so that the lighting effects described above can be viewed through the membrane cover.

In the embodiment illustrated in FIG. 11, it may be desirable to prevent lateral movement of top layer sections 11A–11H relative to bottom layer 12 when the layers are engaged. One way to achieve this is to attach the top layer sections 11A–11H to dome spring elements via an adhesive or other suitable attachment means. Another way to prevent lateral movement of top layer sections 11A–11H relative to bottom layer 12 is to form regions (not shown) in bottom layer 12. A region may define an area for placement of a top layer section 11A–11H to limit the lateral motion of that top layer section 11A–11H relative to bottom layer 12 when the layers are engaged. For example, the fastening elements of bottom layer 12 may be heat sealed or crushed by a die in selected places to form the regions. Regions could be created in bottom layer 12 to define the area for placement of each top layer section 11A–11H.

Figure 12:
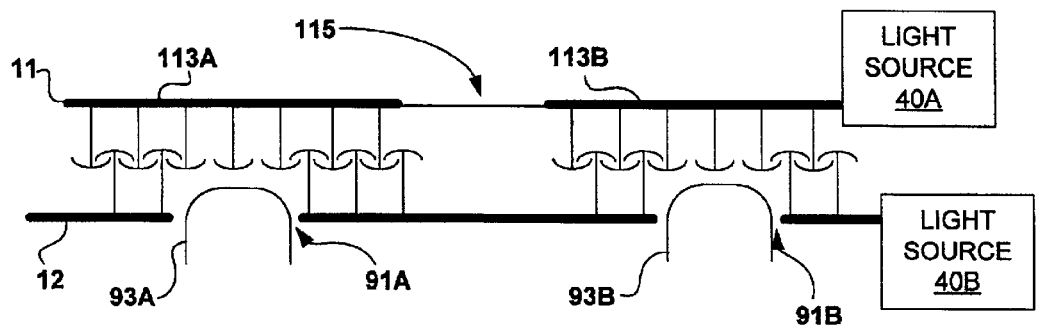
FIG. 12 is another cross-sectional side view of a light guide fastening structure used as part of a switch array.
Figure 13:
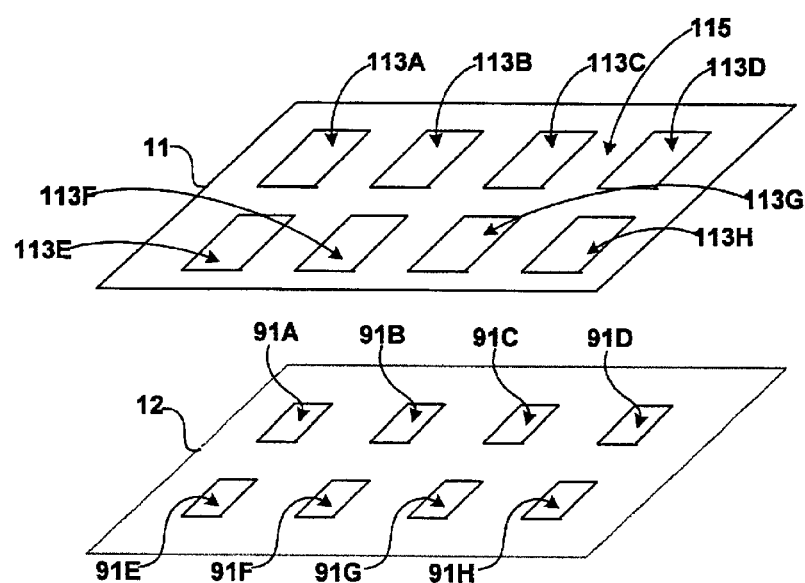
FIG. 13 is another perspective view of an unengaged light guide fastening structure configured for use in a switch array.

FIGS. 12 and 13 illustrate another embodiment, implementing a light guide fastening structure in the form of a bottom layer 12 and a single top layer 11 having rigid elements 113 and elastic regions 115. FIG. 12 is a cross sectional view. As shown, bottom layer 12 is engaged with a top layer 11. Bottom layer 12 is formed with holes 91A and 91B for aligning with spring elements 93A and 93B. Top layer 11 includes rigid elements 113A and 113B and an elastic region 115. For example, in a switch array, rigid elements 113A and 113B may function as the keys that are depressed by a user. Alternatively, additional keycaps (not shown) may be attached to the respective rigid elements 113A and 113B.

FIG. 13 is a perspective view of an unengaged light guide fastening structure in the form of a bottom layer 12 and a top layer 11 according to an embodiment of the invention. As shown, the bottom layer 12 is formed with holes 91A–91H for aligning with spring elements (not shown). Top layer 11 includes rigid elements 113A–113H and one or more elastic regions 115 between the respective rigid elements 113A–113H. Each rigid element 113A–113H may cover one of the holes 91A–91H when the layers are engaged. For example, the layers can be engaged simply by sliding or snapping the top layer 11 and the bottom layer 12 together. By integrating light guide functionality into top layer 11, bottom layer 12, or both, enhanced visual effects can be achieved.

EXAMPLE

To form layers 11 and 12 as described herein, a substantially transparent light guide material such as a transparent polymer can be fed into a single screw extruder (supplied by Davis Standard Corporation of Pawcatuck Connecticut) having a diameter of approximately 6.35 centimeters (2.5 inches), a length/diameter ratio of 24/1, and a temperature profile that steadily increases from approximately 175–232 degrees Celsius (350–450 degrees Fahrenheit). Suitable materials may include polymeric materials such as acrylic, polycarbonate, polyester, polystyrene, styrene acrylonitrile, styrenic block copolymers, acrylonitrile butadiene styrene, polyvinyl chloride, cellulossics, polyamide nylon, polysulfone, polyether sulfone, polyphenyl sulfone, polyethylene, ethylene vinyl acetate, ethylene methylacrylic acid, polypropylene, polybutylene, polyurethane, polymethylpentene, silicone plastics, fluoroplastics, or another suitable clarified material.

In the case where the substantially transparent material is polypropylene, it can be continuously discharged at a pressure of at least 690,000 Pascals (100 pounds per square inch) through a necktube heated to approximately 232 degrees Celsius (450 degrees Fahrenheit) and into an approximately 20-centimeter wide (8-inch wide) MasterFlex LD-40 film die (supplied by Production Components of Eau Claire, Wis.), maintained at a temperature of approximately 232 degrees Celsius (450 degrees Fahrenheit). The die may have a die lip configured to form a film having fastening elements such as elements forming a self-mating profile as shown in FIGS. 1A and 1B.

The polypropylene film can be extruded from the die and drop-cast at about 3 meters/minute (10 feet/minute) into a quench tank maintained at 10–21 degrees Celsius (50–70 degrees Fahrenheit) for a residence time of at least 10 seconds. The quench medium may be water with 0.1–1.0% by weight of a surfactant, Ethoxy CO-40 (a polyoxyethylene caster oil available from Ethox Chemicals, LLC of Greenville, S.C.), to increase wet-out of hydrophobic polyolefin materials.

The quenched film can then be air-dried and collected in 91–137 meter rolls (100–150 yard rolls). The film may have a uniform base film caliper of approximately 0.0356+/−0.005 centimeters (0.014+/−0.002 inches), a fastening elements width (the distance between the outermost ends of the fastening elements, measured in a plane parallel to the base of the film) of about 0.1524+/−0.005 centimeters (0.060+/−0.002 inches). The film may have an extruded basis weight of approximately 700 grams/square meter. The vertical travel permitted may be approximately 0.094 centimeters (0.037 inches). In a separate operation, the extruded films can be annealed to flatten the base sheet by passage over a smooth cast roll maintained at approximately 93 degrees Celsius (200 degrees Fahrenheit), and then wound onto 15.24 centimeter cores (6 inch cores) to minimize web-curl.

Figure 14:
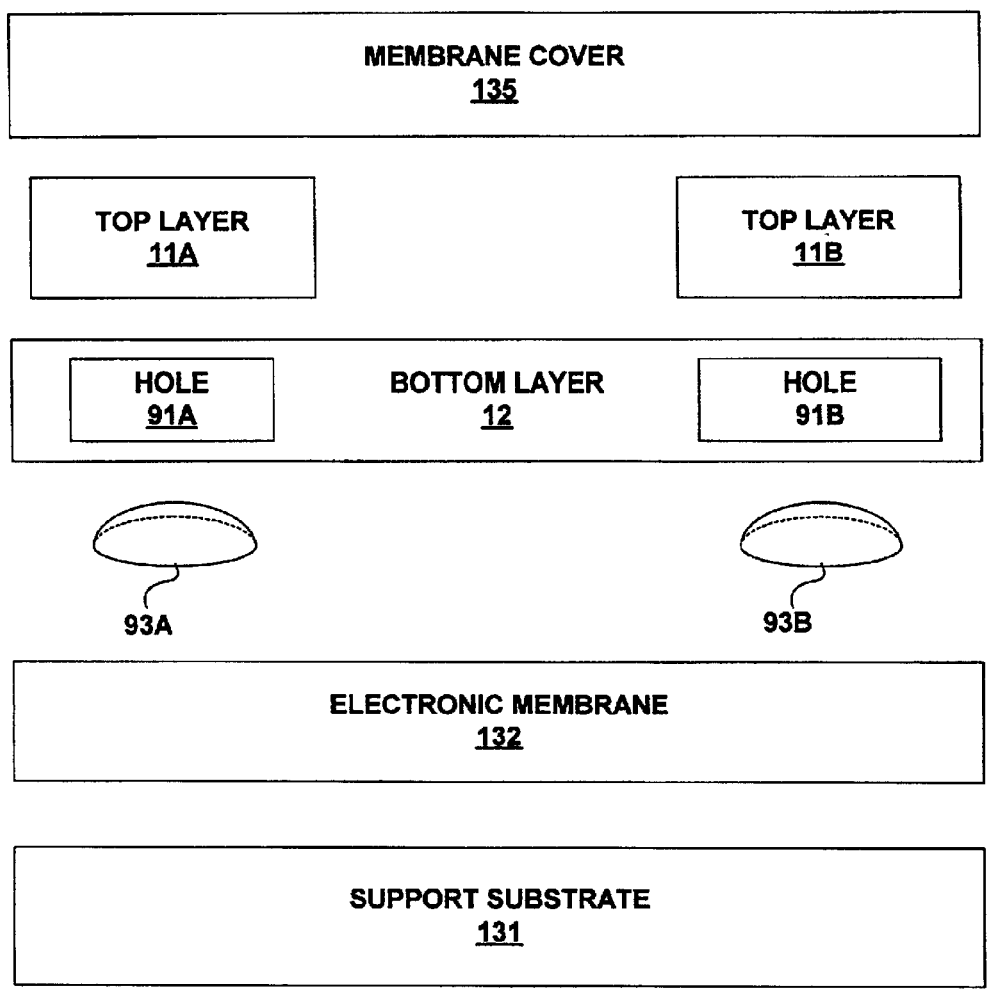
FIG. 14 is an exploded block diagram of two switches of a membrane switch according to an embodiment of the invention.

FIG. 14 is an exploded block diagram of two switches of a membrane switch according to an embodiment of the invention. As shown, a membrane switch may include a support substrate 131 to provide mechanical stability. An electronic membrane 132 may reside on top of the support substrate 131. The electronic membrane may include a plurality of sensors that generate signals in response to an applied physical force. Dome springs 93 may reside on top the electronic membrane 132. The dome springs may be individual dome springs or may be connected to form an array. For example, the dome springs may be metal dome springs or may be formed of a polymeric material such as polyester.

Bottom layer 12 is formed with holes 91A–91B for aligning with dome springs 93A and 93B. A top layer 11 defines top layer sections 11A and 11B that correspond to the holes 91A and 91B in bottom layer 12. In other words, each top layer section 11A and 11B may cover one of the holes 91A and 91B when the top and bottom layers 11, 12 are engaged. Dome springs 93A and 93B can bias top layer sections 11A and 11B away from bottom layer 12. When a physical force is applied to one of the top layer sections 11A or 11B, the force can cause depression of the corresponding dome spring, which in turn causes actuation of a sensor within electronic membrane 132.

Membrane cover 135 can cover the top and bottom layers 11, 12. A light source may illuminate the bottom layer 12 and/or one or more of the top layer sections 11A, 11B as outlined above. Thus, membrane cover 135 may be transparent or partially transparent so that user can see the lighting effects through the membrane cover. In other embodiments, top layer sections 11A and 11B may comprise keys without the additional membrane cover 135, or alternatively key caps may be added in addition to or instead of membrane cover 135. In that case, the light guide functionality may be used to create lighting effects between the keys.

By positioning top layer 11 and bottom layer 12 above dome spring elements 93, stiffening of the area associated with each switch can be achieved. More generally, any form of a stiffening agent can be provided above dome spring elements 93 in accordance with embodiments of the invention. Stiffening the area above the dome spring elements 93 can improve switch arrays, particularly membrane switches, by providing a large rigid area for key actuation. In addition, a larger "sweet spot" may be achieved. Furthermore, the need for membrane cover 135 can be avoided for some embodiments. If membrane cover 135 is used, embossing of the membrane cover 135 can be avoided when a stiffening agent such as top layer 11 is positioned above the area associated with a switch.

The fastening structure including a top layer engaged with a bottom layer as described above may provide design freedoms to a switch array designer. Indeed, compared to conventional switch array configurations, the alignment elements described herein may allow a larger number of keys to be realized in the same amount of area, and can allow the keys to be placed more closely together by eliminating the molding or frame that covers the keys. In addition, as described above, the thickness of switch arrays may be reduced by implementing the fastening structure. Moreover, the need for additional keycaps can be eliminated.

The fastening structure may also provide alignment advantages including facilitating a larger useful contact area for the key, e.g., a larger "sweet spot," and providing resistance to key rocking. In addition, by forming the fastening structure of an optically clear material, the structure may form a light guide that can provide functional or decorative lighting to the switch array as outlined above.

Figure 15:
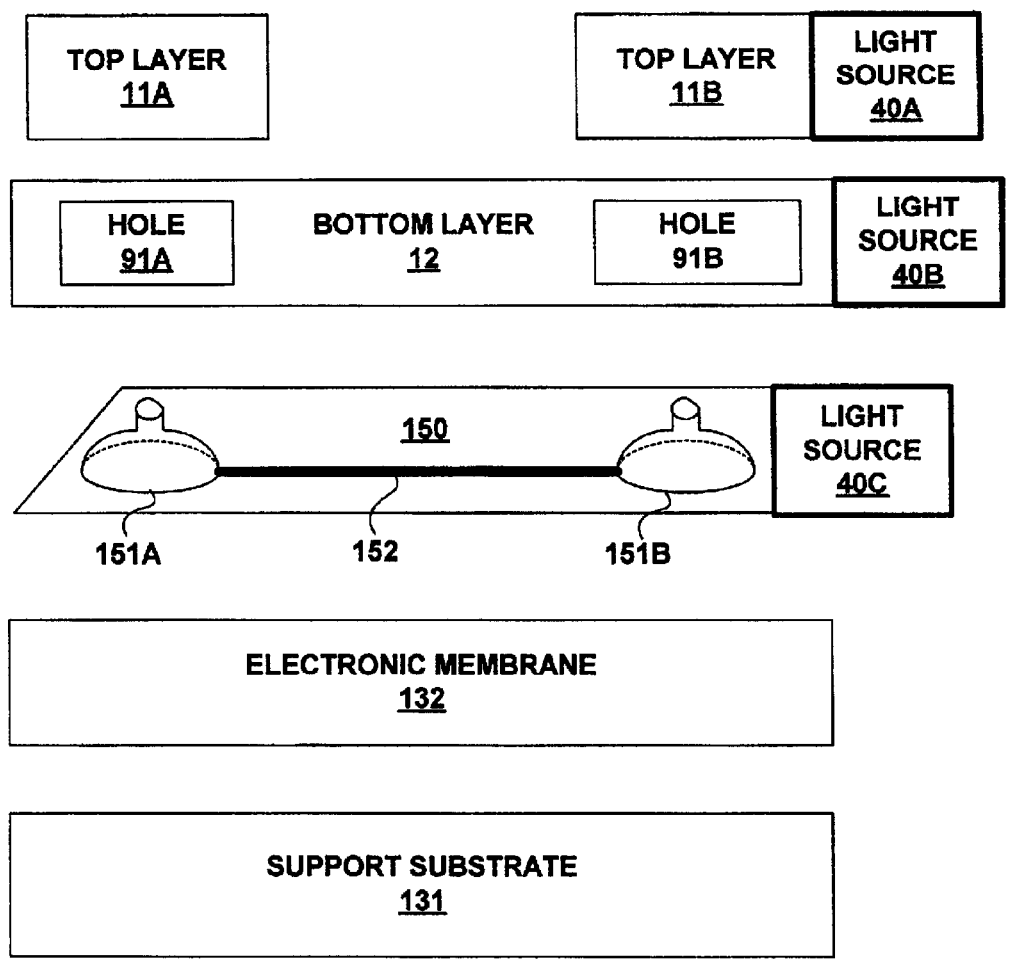
FIG. 15 is an exploded block diagram illustrating an added embodiment of a switch array.

Additionally, the fastening structure can form chambers around dome spring elements to enhance audible indication of key actuation. In other words, the fastening structure as described herein can improve or enhance audible sounds caused by the actuation of dome springs. Thus, actuation of the key may be accompanied by a tactile feel, a more noticeable audible indication, and/or visual effects. In addition, the fastening structure as described herein may provide a hermetic barrier or a partial hermetic barrier between the environment and sensors of a switch array. In these ways, the fastening structure may be used to improve switch arrays. FIG. 15 illustrates an added embodiment of a switch array. As shown, the switch array may include a support substrate 131 to provide mechanical stability, and an electronic membrane 132 may reside on top of the support substrate 131. Again, the electronic membrane may include a plurality of sensors that generate signals in response to an applied physical force. An array of connected dome springs 150 may reside on top of the electronic membrane 132. The dome springs 151A and 151B within the array 150 may be connected by a channel 152 as further described in co-pending and commonly assigned U.S. patent application Ser. No. 09/848,458, which is hereby incorporated by reference in its entirety. Bottom layer 12 is formed with holes 91A–91B for aligning with dome springs 151A and 151B, and a top layer 11 defines top layer sections 11A and 11B that correspond to the holes 91A and 91B in bottom layer 12.

In accordance with one embodiment, the array of dome spring elements 150 comprises a light guide. In other words, the array of dome spring elements 150 can be formed of a material that transmits light via total internal reflection (TIR). One or more light emission features may be added to the array of dome spring elements 150 to cause light to be emitted in a controlled or random manner. Moreover, channels 152 may enhance the lighting effects.

Light source 40C can be used to transmit light through the array of dome spring elements 150 via total internal reflection. If desired, one or more additional light sources 40A and 40B can be used to transmit light through top layer 11 and/or bottom layer 12 as outlined above. By illuminating the array of dome spring elements 150, unique lighting of a switch array may be achieved. Light may be transmitted through the various components that comprise light guides, such as one or more of top layer 11, bottom layer 12 and the array of dome spring elements 150. In some cases different colors, different intensities, or different temporal on/off (flashing) patterns can be used. Also, the different light sources may also be used to achieve various lighting effects such as additive color effects and on-off light switching.

Exemplary implementations of the different embodiments of the invention within switch arrays may include implementations within membrane switches, keypads or keyboards. For example, the invention may be implemented to form part of handled computer devices such as palm computers or cellular radio telephones, laptop or desktop keyboards, switch arrays on an instrument panel of an aircraft, watercraft or motor vehicle, or switch arrays in appliances, musical instruments or any other application where switches are used.

In addition, the fastening structure may be used in other applications unrelated to switch arrays. Specifically, the fastening structure may be used in any application in which both fastening functionality and light guide functionality are desired. Accordingly, the invention is not limited to the exemplary description of switch array embodiments, but is more broadly envisioned as providing useful advantages in any number of a wide variety of applications.

Furthermore, although embodiments have been described for creating a fastening structure via an extrusion process, other processes may be used to realize the same or similar structures. For example, extrusion, profile-extrusion, injection molding, compression molding, thermoforming, rapid prototyping, cast and cure, embossing, or other processes may be used to realize one or more of the structures described herein. In some cases, more complex extrusion processes can be used to form light guide material as part of various layers of a fastening structure. In particular, inclusion co-extrusion, multi-layer extrusion or micro-layer-multi-layer extrusion may be used to include or embed light guiding materials within other materials to realize light guide fastening structures. Inclusion co-extrusion may be useful, for example, to embed glass, polymeric light guiding fibers or high birefringence materials within another material. Additives, such as strengthening agents, colorants, or the like may also be added. Accordingly, other implementations and embodiments are within the scope of the following claims.

What is claimed is:

1. A fastening apparatus comprising:
   a first layer including a first set of fastening elements; and
   a second layer including a second set of fastening elements, wherein the first and second sets of fastening elements are engageable to thereby attach the first layer to the second layer, and wherein a portion of one of the first or second layers forms a light guide.

2. The apparatus of claim 1, wherein the engagements of fastening elements comprise hook-like elements that collectively define a distance of travel between the first and second layers.

3. The apparatus of claim 2, wherein the distance of travel is in the range of 0.01 centimeters to 1 centimeter.

4. A fastening apparatus comprising:
   a first layer including a first set of fastening elements;
   a second layer including a second set of fastening elements; and
   a spring element biasing the first and second layers away from one another, wherein the first and second sets of fastening elements are engageable to thereby attach the first layer to the second layer, and wherein both the first and second layers are light guides.

5. The apparatus of claim 1, wherein the portion forming the light guide transmits light via total internal reflection.

6. The apparatus of claim 1, wherein the portion forming the light guide includes emission features to extract light from the light guide.

7. The apparatus of claim 6, wherein the emission features comprise one of the following: notches and coatings.

8. A fastening apparatus comprising:
   a bottom layer comprising a first light guide;
   a top layer comprising a second light guide; and
   means for engaging the top and bottom layers such that upon engagement, an amount of ravel is defined between the top and bottom layers.

9. The apparatus of claim 8, wherein the means for engaging includes a plurality of hook-like elements that extend from both the top and bottom layers.

10. The apparatus of claim 8, wherein the light guides transmit light via total internal reflection.

11. The apparatus of claim 8, wherein at least one of the light guides includes emission features to extract light from the respective light guide.

12. The apparatus of claim 11, wherein the emission features comprise one of the following: notches and coatings.

13. A light guide fastening structure comprising:
   a first layer forming a light guide and including a first plurality of fastening elements; and
   a second layer forming a light guide and including a second plurality of fastening elements, wherein the second plurality of fastening elements are engagable with the first plurality of fastening demerits such that the first and second layers can be attached to one another.

14. The structure of claim 13, further comprising a light source positioned to illuminate one of the layers.

15. The structure of claim 14, wherein the light source is a light emitting diode (LED).

16. The structure of claim 14, further comprising a number of light sources positioned to illuminate the layers.

17. The structure of claim 13, wherein the engaged pluralities of fastening elements collectively define an amount of travel between the layers.

18. The structure of claim 13, wherein the layers of the light guide fastening structure transmit light via total internal reflection.

19. The structure of claim 13, the layers include emission features to extract light.

20. The structure of claim 19, the emission features comprise one of the following: surface topography features and material property features.

21. A light guide fastening structure comprising:
   a first layer forming a light guide and including first plurality of fastening elements;
   a second layer forming a light guide and including a second plurality of fastening elements, wherein the second plurality of fastening elements engage the first plurality of fastening elements and define an amount of travel between the first end second layers; and
   a first light source positioned to illuminate the first layer of the light guide fastening structure.

22. The structure of claim 21, wherein light is transmitted between the layers when the layers are engaged in a first position and substantially no light is transmitted between the layers when the layers are engaged in a second position.

23. The structure of claim 21, further comprising a second light source positioned to illuminate the second layer.

24. The structure of claim 23, wherein the first light source emits a first color of light and the second light source emits a second color of light, wherein the first and second colors of light are not substantially transmitted in additive manner when the layers are engaged in a first position and the first and second colors of light are substantially transmitted in additive manner when the layers are engaged in a second position.

25. The structure of claim 21, further comprising an optical element positioned to distribute light from the light source into the first layer of the light guide fastening structure.

26. The structure of claim 21, wherein light is transmitted between the first and second layers and extracted from the second layer.

27. A method comprising:
   engaging a first layer of a light guide fastening structure with a second layer of a light guide fastening structure; and
   transmitting light via total internal reflection (TIR) through one of the layers.

28. The method of claim 27, further comprising:
engaging the first layer of the light guide fastening structure with the second layer of the light guide fastening structure in a first position to substantially transmit light between the layers; and
engaging the first layer of the light guide fastening structure with the second layer of the light guide fastening structure in a second position to substantially not transmit light between the layers.

29. The method of claim 27, further comprising:
transmitting light via total internal reflection (TIR) through both of the layers of the light guide fastening structure.

30. The method of claim 29, further comprising transmitting different colors of light through the first and second layers of the light guide fastening structure.

31. The method of claim 30, further comprising:
engaging the first layer of the light guide fastening structure with the second layer of the light guide fastening structure in a first position to substantially transmit light between the layers such that the different colors of light substantially combine in an additive manner; and
engaging the first layer of the light guide fastening structure with the second layer of the light guide fastening structure in a second position to substantially not transmit light between the layers such that the different colors of light do not substantially combine in an additive manner.

32. The method of claim 27, further comprising transmitting light between the layers.

33. The method of claim 32, further comprising extracting light from one of the layers.

34. A switch array comprising:
an array of sensor elements that generate signals in response to force;
an array of spring elements corresponding to the array of sensor elements;
a bottom layer including a first set of fastening elements, the bottom layer defining holes for aligning with the spring elements; and
a number of top layer sections each including second sets of fastening elements, wherein the first and second sets of fastening elements are engaged, thereby attaching the bottom layer to the top layer sections, and wherein one of the bottom layer or top layer sections form a light guide.

35. The switch array of claim 34, wherein the bottom layer and each of the top layer sections form light guides.

36. The switch array of claim 34, wherein the engaged sets of fastening elements define a distance of travel between the bottom layer and each top layer section.

37. The switch array of claim 36, wherein the top layer sections are biased away from the bottom layer upon protrusion of the spring elements through the holes in the bottom layer.

38. The switch array of claim 34, wherein the spring elements are dome spring elements.

39. The switch array of claim 38, wherein the dome spring elements are individually positioned and unattached to one another.

40. The switch array of claim 38, wherein the dome spring elements comprise an array of dome spring elements connected to one another.

41. The switch array of claim 40, wherein the array of dome spring elements form a light guide that can transmit light via total internal reflection.

42. The switch array of claim 41, wherein the array of dome spring elements further comprise one or more channels between dome spring elements in the array of dome spring elements.

43. The switch array of claim 34, wherein each of the top layer sections comprises a key of the switch array.

44. The switch array of claim 34, the top and bottom layers are extruded films.

45. The switch array of claim 34, wherein the switch array is selected from the following group of switch arrays: a computer keyboard, a membrane switch array, a keypad, an instrument panel of an aircraft, an instrument panel of a watercraft, an instrument panel of a motor vehicle, a switch array for an appliance and a switch array of a musical instrument.

46. An apparatus comprising:
an array of dome spring elements, wherein part of the array of dome spring elements is a light guide that transmits light via total internal reflection.

47. The apparatus of claim 46, further comprising a light source that illuminates the array of dome spring elements to cause the transmission of light via total internal reflection.

* * * * *

UNITED STATES PATENT AND TRADEMARK OFFICE
CERTIFICATE OF CORRECTION

PATENT NO.    : 6,827,459 B2
DATED         : December 7, 2004
INVENTOR(S)   : Johnston, Raymond P.

It is certified that error appears in the above-identified patent and that said Letters Patent is hereby corrected as shown below:

Column 11,
Line 31, delete the word "engagements" and insert -- engaged sets --, therefor.
Line 58, delete the word "ravel" and insert -- travel --, therefor.

Column 12,
Line 11, delete the word "demerits" and insert -- elements --, therefor.
Line 38, delete the word "end" and insert -- and --, therefor.

Signed and Sealed this

Thirty-first Day of May, 2005

JON W. DUDAS
*Director of the United States Patent and Trademark Office*